March 15, 1949.    L. M. PIDGEON ET AL    2,464,767
PRODUCTION OF CALCIUM
Filed Oct. 15, 1945

Inventors:
L.M.Pidgeon and S.A.McCatty
By Alex. E. MacRae
Attorney.

Patented Mar. 15, 1949

2,464,767

UNITED STATES PATENT OFFICE 2,464,767

PRODUCTION OF CALCIUM

Lloyd Montgomery Pidgeon and Sidney Alexander McCatty, Toronto, Ontario, Canada, assignors to Dominion Magnesium Limited, Toronto, Ontario, Canada, a corporation of Ontario Application October 15, 1945, Serial No. 622,366
In Canada September 6, 1945

1 Claim. (Cl. 75—67)

This invention relates to the production of metallic calcium and more particularly to the thermal reduction of calcium oxide (lime) for the production of substantially pure calcium in coherent structural form.

Lime and the limestone from which it is usually prepared normally contains magnesia. The lime used in the present method should not have a magnesia content substantially exceeding 1%. It may be produced from high calcium limestone which contains not more than 3% total impurities and not more than 2% of magnesium carbonate. A useful lime for the purpose is the residue from the production of acetylene from carbide. Magnesium in the lime creates difficulties in the production of pure calcium. It tends to form with the calcium a eutectic which melts at a relatively low temperature and which interferes with the condensation of calcium vapors and the removal of the solid calcium from the condenser.

The lime is preferably finely ground so that about 70% passes a 200 mesh screen. It is mixed with aluminum, as a reducing agent, and formed into small dense briquettes having an apparent density of about 2.2. Briquettes weighing 15 to 18 grams have been used effectively. When the briquettes are heated as hereinafter described the reactions taking place are illustrated by the following equations:

(1) 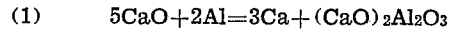
$$5CaO + 2Al = 3Ca + (CaO)_2Al_2O_3$$

(2) 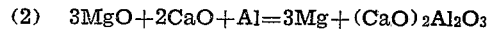
$$3MgO + 2CaO + Al = 3Mg + (CaO)_2Al_2O_3$$

While the theoretical amount of aluminum is effective in reducing the lime, it is found that higher production is obtained by using proportions of aluminum in the mix which are 5 to 20% in excess of the theoretical.

The apparatus used is shown in the accompanying drawing in which—

Figure 1:
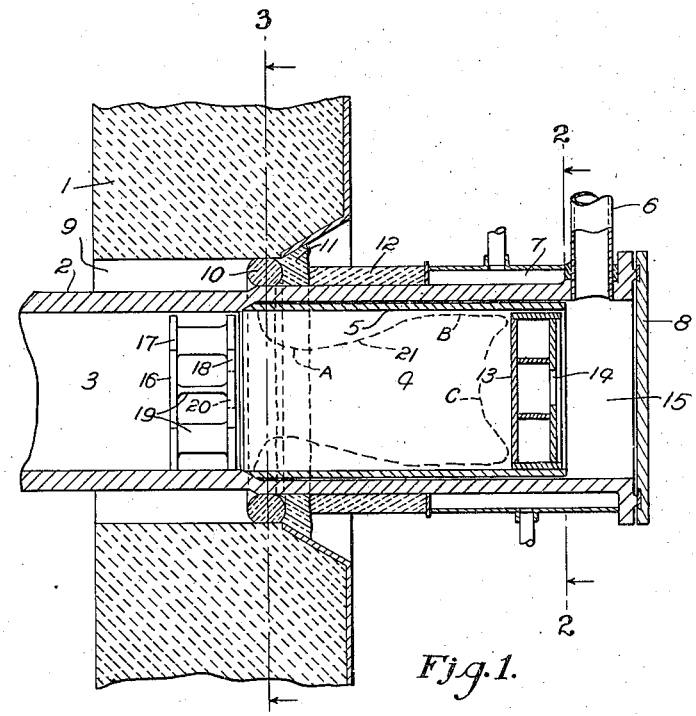
Figure 1 is a partial longitudinal section of a retort horizontally disposed in a furnace.
Figures 2, 3:
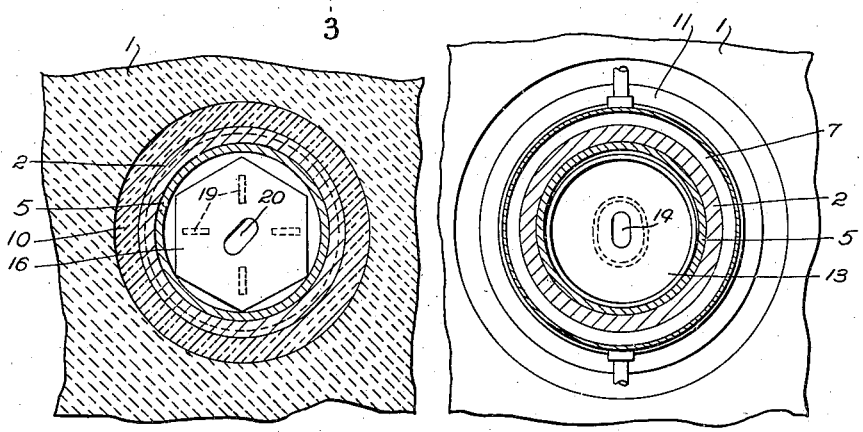
Figure 2 is a cross section on line 2—2 of Figure 1.
Figure 3 is a cross section on line 3—3 of Figure 1.

In the drawing 1 is a furnace adapted to receive any desired number of horizontally disposed metal retorts 2. Each retort has a reducing zone or chamber 3 in which the briquettes are placed for heat treatment and a condensing zone 4 in which metallic vapours are condensed. A removable liner or sleeve 5 is located in the condenser zone and projects within the wall of the furnace. The conduit 6 connects the retort to vacuum providing means. 7 is a water or like cooler and 8 a closure for the end of the retort.

A so-called orifice plate or heat radiating shield 16 separates the reducing zone 3 from the condensing zone 4. It comprises two hexagonal plates 17 and 18 united by ribs 19. In the outer end is an orifice 20 to receive a tool for placement or removal of the plate. In the outer end of the condenser sleeve is a baffle 13 which in the form shown is a reinforced cylindrical box having an orifice 14 in its outer end for placement or removal.

As will appear from the later description close control of the temperature in the condenser is important to produce a hot zone for condensation of the calcium vapours. A space 9 is provided between the thick heat insulating wall of the furnace and the retort and this space is sealed adjacent the inner end of the condenser section of the retort by an asbestos rope or the like 10 and asbestos packing 11. Insulation 12 surrounds the calcium condensing zone of the retort. The inner zone of the condenser is thus maintained at a temperature at which magnesium vapour will not condense. The calcium vapour condenses into a coherent structure.

In operation the briquettes are placed in the reducing zone of the retorts located in the furnace and with the respective parts in position the retort is closed. A vacuum of 10 microns or better is then applied and maintained substantially throughout the period of treating the charge. The furnace itself is maintained hot to provide a reducing temperature in the retort of substantially 1170° C. to cause the reactions above indicated to proceed and volatilize the calcium and magnesium in the charge. The time of the heating cycle may be varied. With charges of 100 pounds per retort recoveries of 85.8, 92.0 and 96.0% of calcium have been obtained in heating cycles of 12, 17 and 24 hours respectively.

The calcium vapour condenses into coherent metal crowns A as indicated in the drawing in a zone maintained during the cycle at a temperature of not less than 740 to 680° C. while the magnesium vapour condenses at C in a zone maintained at a temperature about 350 to 275° C. The intermediate portion of the condenser is at a temperature of about 485 to 400° C. and a small amount of calcium with some magnesium condenses here. The crowns of calcium are free from magnesium and retain their structural form when the vapours are condensed at the relatively high temperature. At the end of the heating cycle, the time of which may be varied as indicated, the retort is opened and discharged. The baffle 13 and the condenser sleeve 5 are removed with the hot solid metal thereon. The shield 16 is withdrawn and the dry residue of the initial charge removed.

To facilitate removal of the condensed metal from the condenser sleeve the latter is coated with sodium silicate, kaolin or graphite. Sodium silicate has given best results. The small deposit B of calcium and magnesium may be readily broken away from the calcium crowns.

To illustrate the highly beneficial effect of using in the briquetted charge an excess of the reducing agent the following results are given. With the theoretical proportions of aluminum the weight of the calcium crowns produced were 18.1 lbs. in a 12 hour cycle and 23.2 lbs. in a 16 hour cycle. With 110% of the theoretical amount of aluminum the weight of the crowns were 21.0 and 26.2 lbs. respectively, that is an increase in calcium production of 16.6 and 12.9% respectively. Using 120% of the theoretical amount of aluminum the crowns weighed 21.7 and 24.1 lbs. respectively, that is only a slight further increase in the shorter heating cycle.

What we claim is:

Process for the production of substantially pure metallic calcium in coherent structural form which comprises heating briquettes of a mixture consisting essentially of finely divided metallic aluminum and a finely divided lime material, the latter containing not more than 3% of impurities and not substantially more than 1% of magnesia, in a retort at a temperature of about 1170° C. and at a pressure of the order of 10 microns, passing the resulting vapors into a communicating condenser having a first zone maintained at a temperature within the range from 740° C. to 680° C., a second zone maintained at a temperature within the range from 485° C. to 400° C. and a third zone maintained at a temperature within the range from 350° C. to 275° C. and recovering the deposited calcium from said first zone.

LLOYD MONTGOMERY PIDGEON.
SIDNEY ALEXANDER McCATTY.

REFERENCES CITED

The following references are of record in the file of this patent:

UNITED STATES PATENTS

| Number | Name | Date |
|---|---|---|
| 1,814,072 | Bakken | July 14, 1931 |
| 1,814,073 | Bakken | July 14, 1931 |
| 2,179,823 | Kemmer | Nov. 14, 1939 |
| 2,213,170 | Peake et al. | Aug. 27, 1940 |
| 2,258,374 | Amati | Oct. 7, 1941 |
| 2,362,440 | Hartel | Nov. 14, 1944 |
| 2,370,898 | Whiton et al. | Mar. 6, 1945 |
| 2,383,209 | Newkirk et al. | Aug. 21, 1945 |
| 2,387,677 | Pidgeon | Oct. 23, 1945 |
| 2,391,193 | Rademaker | Dec. 18, 1945 |